lifted or by releasing it the excavator will drop by gravity and dig its way into the ground.

When the buckets 42 go over the top of the excavator, they dump the dirt through the vertical chute 60, and to provide for the lateral adjustment of the machine this chute is provided with back plates 61, (see Figs. 1 and 2,) which are hinged and which therefore permit the chute to be made of the necessary width.

The top shaft 32 of the excavator connects by links 62 and 63, which are pivotally connected by the shaft 64 with the shaft of the engine 59, and the excavator is driven by sprocket-chains 65 and 66, connecting over suitable sprocket-wheel with the shaft 32. This driving mechanism I have not attempted to show in detail, as obviously it can be of any usual type and any driving scheme can be substituted for that which is shown.

When the excavated material drops through the chute 60, it is received in the trough 61$^a$ and lifted by the supplemental or auxiliary carrier 67, which can be of any usual type of endless buckets and which is carried on the shafts 68 and 69, the latter being driven by a sprocket-chain 70, connecting with the engine, and the carrier being supported in a suitable framework 71. The carrier 67 discharges into a hopper 72, which is mounted on the frame 10, and this has a lateral discharge-spout 73, which is controlled by a door or gate 74, sliding in suitable ways 75.

When the excavator is in operation, the car is propelled forward by a sprocket-chain 76, connecting the engine with the forward axle, or any other suitable driving means can be substituted.

From the foregoing description it will be seen that I have devised a comparatively simple machine which is adapted to dig ditches of any desired depth or width within the scope of the machine and that it can be very easily controlled and operated. In regulating the depth of the ditch the operator can simply adjust the cable 53 so as to permit the excavator to drop to a certain depth only, and then when the machine is started it will move forward steadily, excavate the material from the ditch, and discharge it, as described.

Having thus fully described my invention, I claim as new and desire to secure by Letters Patent—

1. An excavating-machine, comprising a portable and laterally-adjustable supporting-frame, and excavating machinery carried by the frame.

2. An excavating-machine, comprising a laterally-adjustable portable frame, a main excavator mounted vertically in the frame and adapted to drop by gravity, and means for regulating the movement of the excavator.

3. In an excavating-machine, the combination with the main frame adapted for lateral expansion, of the shaft arranged longitudinally of the frame, the nuts mounted to travel on the shaft and to engage a screw-thread thereon, and means as the links connected with the nuts and frame to regulate the frame width by the movement of the nuts.

4. In an excavating-machine, the combination with the laterally-adjustable frame, of a rotary shaft mounted in the frame, and an operative connection between the shaft and the frame sides by which the latter can be moved in and out.

5. In an excavating-machine, the combination with the main frame having its sides adapted to move in and out in relation to each other, of the threaded shaft mounted longitudinally in the frame, the shaft having portions thereon of opposite pitch, the nuts held to engage the threaded portions of the shaft, and links extending from the nuts to the frame sides.

6. In an excavating-machine, the combination with the laterally-adjustable frame, the longitudinally-arranged shaft, and means for adjusting the frame, of the bearings for the shaft and the cross-pieces on the frame sides, the said cross-pieces having sliding connection with the bearings.

7. In an excavating-machine, the combination with the vertically-arranged main excavator movable up and down in the machine, of an auxiliary carrier arranged to receive the discharge from the main excavator, and a covered chute leading from the said main excavator to the said carrier.

8. In an excavating-machine, the combination with the vertically-arranged main excavator adapted to drop through the machine, of the auxiliary carrier to receive the discharge from the main excavator, an adjustable chute leading from the said excavator to the said carrier, and a hopper to receive the discharge from the said carrier.

9. In an excavating-machine, the combination with the adjustable frame, of the main excavator vertically mounted therein, and a laterally-adjustable chute inclosing the dumping portion of the main excavator.

10. The combination with the excavator having a series of buckets linked together to form a chain, of brackets carried by the bucket connections and extending outward between the several buckets, and picks carried by the brackets and extending adjacent to the bucket edges.

11. The combination with the excavator, comprising a series of buckets, of the picks resiliently mounted in advance of the buckets.

UNITED STATES PATENT OFFICE.

HENRY G. ECKSTEIN, OF CHICAGO, ILLINOIS.

PAPER CARTON.

No. 797,504.           Specification of Letters Patent.           Patented Aug. 15, 1905.

Application filed July 25, 1903. Serial No. 166,960.

*To all whom it may concern:*

Be it known that I, HENRY G. ECKSTEIN, a citizen of the United States, and a resident of Chicago, in the county of Cook and State of Illinois, have invented certain new and useful Improvements in Paper Cartons, of which the following is a full, clear, and exact description.

The invention relates particularly to that class of paper cartons designed to contain candies, confections, or like material that must be protected from atmospheric moisture; and the invention consists in the improved carton hereinafter described, illustrated in the accompanying drawings, and more particularly defined in the claim at the end of this specification.

With a view to rendering paper cartons moisture-tight such cartons have heretofore been made by first coating stiff paper with a light film of melted paraffin-wax on one or both sides, and after the setting of the wax the paper has been scored along the lines upon which the sheets or blanks were to be folded, the ends of the sheets being cut to form flaps or tongues. These blanks or sheets after having been first waxed and then scored and cut, as above indicated, were then folded into rectangular form, the meeting edges of the sheets being left unsealed or loose, for the reason that glue would not adhere to the previously-waxed surfaces. Such form of carton is defective, first, because the scoring of the previously-waxed sheet or blank serves to break the films of wax, thereby permitting moisture to leak into the carton along its corners, and, second, because the unsealed overlapping edges of the blank or sheet permits moisture to enter the carton at such point. Attempt has heretofore been made to obviate the defects of this old form of waterproofed carton by leaving the edges of the blank or sheet that are to be overlapped uncoated with paraffin, so that such edges shall receive glue, thereby permitting the lapped edges of the folded carton to be sealed; but the carton thus formed is plainly not moisture-proof, because the atmospheric moisture will penetrate through its uncoated and overlapped edges. Other cartons have been employed in which the inner lining is formed of thin waxed paper which does not have to be scored to form the corners; but such thin flexible inner linings will not carry sufficient waterproofing material to thoroughly protect the contents of the package.

By my present invention I have provided a moisture-proof carton that serves to effectively exclude atmospheric moisture from the articles contained within the cartons. The efficiency of my carton over prior devices of similar character has been demonstrated more particularly in its use for containing candied popcorn, which when exposed even for a short time to atmospheric moisture becomes sticky and soft, and so unsalable. I have found in practice that by inclosing such confection in my improved moisture-proof carton it may be retained for weeks in dry and brittle condition and without deterioration.

In forming my improved carton an unwaxed blank of stiff paper of sufficient weight to absorb a large quantity of paraffin is employed, the paper being sufficiently stiff to retain the shape of the carton when folded. The stiff heavy paper blank is cut at its ends to form the terminal end flaps and scored to form the corners between the sides of the carton and between the sides and the foldable end flaps. The side edges of the cut and scored blank are then overlapped and sealed. In this open-ended condition the carton is dipped in melted paraffin, so that its entire body, including the terminal end flaps, corner-scores, and overlapped sealed portions, are thoroughly impregnated with the paraffin-wax, so that when the end flaps are folded to close the package the contents of the carton is protected at all points from atmospheric moisture.

Referring to the accompanying drawings, Figure 1 is a view of a flat blank after it has been cut and scored. Fig. 2 is a perspective view of the blank after it has been folded into rectangular form. Fig. 3 illustrates the carton after one end has been closed and with the terminal flaps of its opposite end in readiness to be closed.

A designates the body portion of the carton-blank, which, as stated, is formed of a sheet of heavy stiff Manila paper of good quality. The blank is severed along lines $a$ to form the terminal side flaps B and the terminal edge flaps C. The blank is also scored along lines $a'$ to determine the corner-folds between the sides of the carton and between the sides and the end flaps B and C. The side edges of the blank are then brought together, overlapped, and sealed by a suitable glue, which readily adheres to the unwaxed blank. A foldable carton in the shape of a collapsible open-ended tube with foldable flaps at its end is thus formed and in this condition is immersed in a bath of hot melted paraffin-wax, refined paraffin-wax that melts at, e. g., 123° to 125° Fahrenheit being preferably employed. The wax-bath is ordinarily maintained at about 230° Fahrenheit. While thus submerged in the bath all portions of the carton-blank become impregnated with the wax, and when the blank is withdrawn from the bath it is preferably subjected to a blast of cool air, so as to hurry the operation and cause a film of wax to form upon the entire surface of the blank. By thus impregnating the blank with wax after it has been scored and severed and after its overlapping edges have been sealed not only is the body of the paper rendered moisture-proof at all points, but the scored corners of the package are coated with films of wax which allow the terminal flaps to be folded without destroying the moisture-proof character of the blank at its corners. When the blank formed as shown in Fig. 2 has been coated with wax and cooled, the flaps C at one end will be first turned inward at right angles to the body of the carton, and the flaps B will then be turned inward to like position. The carton will then be filled with the material that it is to contain, after which the terminal flaps at the opposite end will be closed. The carton thus closed, with its contained material, will ordinarily be placed within an outer jacket or casing of cardboard, paper, or the like that will serve to protect the carton and retain the terminal flaps in their closed position.

Having thus described my invention, what I claim as new, and desire to secure by Letters Patent, is—

A foldable, moisture-proof carton formed of a stiff, paper blank cut at its opposite ends to form the unsealed, foldable end flaps, and scored vertically and transversely to form the corner-folds and having its side edges overlapped and sealed, the entire body of the carton including said unsealed foldable end flaps and said scored and sealed portions being subsequently impregnated throughout with wax, whereby a package substantially moisture-proof at all points is formed when the end flaps are folded upon one another, substantially as described.

HENRY G. ECKSTEIN.

Witnesses:
ALBERTA ADAMICK,
LILLIAN PRENTICE.